(12) United States Patent
Specht

(10) Patent No.: US 6,206,419 B1
(45) Date of Patent: Mar. 27, 2001

(54) DEVICE FOR INFLATING AN AIRBAG

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/351,831

(22) Filed: Jul. 13, 1999

(30) Foreign Application Priority Data

Jul. 23, 1998 (DE) ......................................... 298 13 149 U

(51) Int. Cl.⁷ .................................................. B60R 21/26
(52) U.S. Cl. ........................ 280/736; 280/742; 280/740
(58) Field of Search ..................................... 280/736, 737, 280/741, 740, 742, 738; 222/3

(56) References Cited

U.S. PATENT DOCUMENTS

| | | | |
|---|---|---|---|
| 3,704,032 | * 11/1972 | Fiala .......................................... | 222/3 |
| 3,815,935 | 6/1974 | Jones . | |
| 3,887,109 | * 6/1975 | Libkie ....................................... | 222/3 |
| 4,006,919 | 2/1977 | Neuman .................................. | 280/736 |
| 4,817,828 | * 4/1989 | Goetz ..................................... | 280/740 |
| 4,846,368 | * 7/1989 | Goetz ....................................... | 222/3 |
| 5,433,475 | * 7/1995 | Kokeguchi ............................. | 280/736 |
| 5,437,473 | * 8/1995 | Henseler ................................. | 280/738 |
| 5,492,365 | * 2/1996 | Bayley et al. ......................... | 280/741 |
| 5,642,902 | * 7/1997 | France ..................................... | 280/741 |
| 5,707,078 | * 1/1998 | Swanberg et al. ..................... | 280/742 |
| 5,820,162 | * 10/1998 | Fink ........................................ | 280/742 |
| 5,863,578 | * 1/1999 | Guarino ................................. | 280/740 |
| 6,050,601 | * 4/2000 | Pantke et al. .......................... | 280/736 |
| 6,062,598 | * 5/2000 | Faigle ..................................... | 280/736 |

FOREIGN PATENT DOCUMENTS

| | | |
|---|---|---|
| 0812741A1 | 12/1997 | (EP) . |
| 0974500A1 | 1/2000 | (EP) . |
| 9734785 WO | 9/1997 | (WO) . |

* cited by examiner

*Primary Examiner*—Douglas Hess
*Assistant Examiner*—Lynda Jasmin
(74) *Attorney, Agent, or Firm*—Lonnie Drayer; Benjamin Colley

(57) ABSTRACT

A device for inflating an airbag has a gas generator that produces an inflation gas. A valve control adjusts the cross-section of a flow channel through which the inflation gas is supplied to the interior of the airbag by means of valve elements. The valve elements are held in an unactivated position by holding elements with a holding force that is lower than the actuating force used to actuate the valve elements.

6 Claims, 1 Drawing Sheet

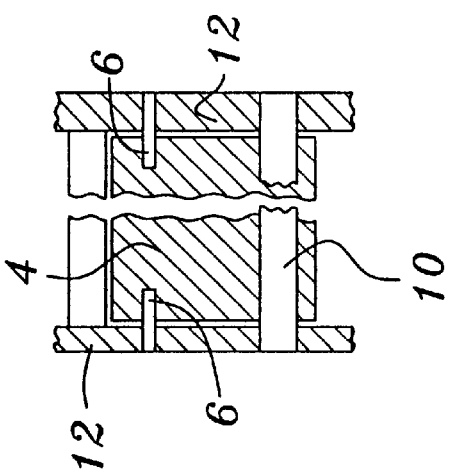
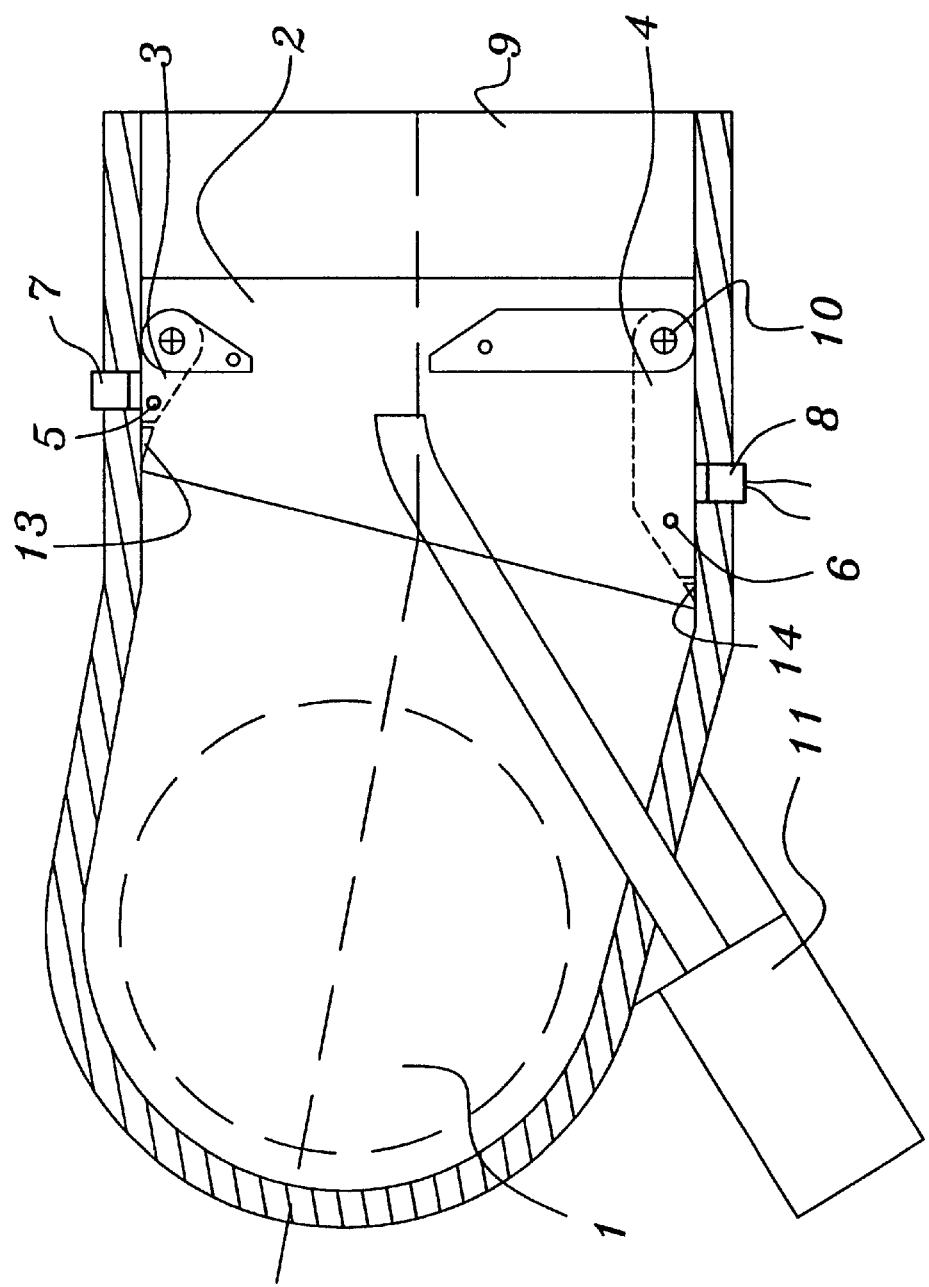

DEVICE FOR INFLATING AN AIRBAG

FIELD OF THE INVENTION

The invention relates to a device for inflating an airbag having a gas generator for producing an inflation gas and a valve control for adjusting a cross section of a flow channel through which the inflation gas supplied to the interior of the airbag, by means of valve elements.

DISCUSSION OF THE PRIOR ART

A device of this type is known from EP 0812741 A1. With the known device, the quantity of inflation gas supplied to the airbag is regulated by a valve control, one or more controlled shutters being used as valve elements which are provided in the path of gas flow between the gas generator and the interior of the airbag. The quantity of inflation gas supplied to the interior of the airbag is controlled as a function of the unimpeded advance movement of the airbag into the passenger compartment. The risk of injury to a vehicle occupant located "out of position", for example in a forwardly displaced position, is thus avoided. The presence of a child seat in the path of advance movement of the airbag is also allowed for, and the quantity of inflation gas supplied to the interior of the airbag controlled accordingly.

SUMMARY OF THE INVENTION

It is an object of the invention to provide a device of the type mentioned at the outset in which controlled actuation of the valve elements is improved.

According to the invention, this object is achieved in that the valve elements are held, in particular in a rattle-free manner, in their rest position with a holding force which is lower than the actuating force used to actuate the valve elements, as described in the characterising portion of the main claim.

This ensures that the valve elements are held securely in their rest position. The risk that the valve elements will be moved unintentionally from the rest position by the gas stream, vibrations and the like is avoided by the holding elements designed, in particular, as shear elements, for example shear pins. The holding force of the holding elements is so designed that it is lower than the actuating force with which the valve elements are moved into the cross section of flow of the inflation gas stream by suitable actuators. However, the holding force is greater than forces exerted by the inflation gas stream on the valve elements due to turbulence, suction and the like. This ensures that even the maximum cross section of flow for the inflation gas streaming into the interior of the airbag is reliably available if there is no obstacle in the path of advance movement of the airbag as it is inflated. When the valve control is activated the valve elements can be actuated by pyrotechnic devices activated as a function of the desired control, by stored mechanical energy (for example springs) which is released as a function of the valve control, or by electromagnetic devices, or other suitable means.

Valve flaps which can be pivoted into the cross section of flow of the inflation gas, valve slides that are slid into the cross section of flow, or valve shutters of a different design can be used as valve elements. One valve element or a plurality of valve elements can be provided, in particular for incremental control.

Noises due to rattling of the valves are avoided during normal vehicle operation, in particular, as a result of the rattle-free positioning of the valve elements.

BRIEF DESCRIPTION OF THE DRAWINGS

An embodiment of the invention will be described in more detail hereinafter with reference to the figures, in which:

FIG. 1 is a section through an embodiment; and

FIG. 2 is a plan view of a valve element arrangement in its rest position.

DETAILED DESCRIPTION OF THE INVENTION

FIG. 1 shows a gas generator 1 adapted to inflate an airbag 9 arranged in an airbag compartment in an undeployed state, via a flow channel 2. The gas generator 1 produces an inflation gas that is supplied to the interior of the airbag 9 through the flow channel 2. The path of advance movement of the airbag 9 as it is inflated and deployed is tracked by means of a scanner 11 such as that known from EP 0812741 A1 and described in detail in DE 29811733.9 U1. If there is an obstacle, for example a child seat or an "out of position" vehicle occupant in the path of advance movement of the airbag, a valve control is activated, reducing the cross section of flow of the flow channel 2 to restrict the supply of inflation gas to the airbag 9.

To reduce the cross section of the flow channel, valve elements 3, 4 in the form of pivotable flaps adapted to pivot around pivot axes 10 in the flow channel 2 between the gas generator 1 and the airbag 9 are provided in the embodiment illustrated. Using correspondingly designed actuators 7, 8 which are associated with the respective valve element 3, 4, it is possible to pivot the valve elements individually or together during valve control from an inactivated position, shown in broken lines in FIG. 1 and in solid lines in FIG. 2, into the positions shown in solid lines in FIG. 1. The actuators 7, 8 can be actuated by pyrotechnic energy, mechanical energy, for example springs, or electromagnetically. The respective actuator 7, 8 can be activated by a corresponding ignition signal or actuating signal.

Holding elements 5, 6, which are designed as shear pins in the embodiment illustrated, are provided to hold the valve elements 3, 4 securely in their unactivated positions. These shear pins 5, 6 are anchored in one or both lateral walls 12 of the flow channel 2, as shown in FIG. 2, for the holding element 6 designed as a shear pin. The entire cross section of the flow channel 2 is unobstructed when the valve elements are in their unactivated positions. The valve elements 3, 4 adopt this unactivated position during normal vehicle operation. The valve elements 3, 4 also adopt the unactivated position when the entire cross section of the flow channel is to be cleared for inflating the airbag 9, i.e. in the case where an unimpeded advance of the airbag into the passenger compartment is detected by the scanner 11. Stationary intake edges 13, 14 are also provided in front of the valve elements 3, 4 in the illustrated embodiment and pass over into beveled front surfaces of the valve elements 3, 4 for achieving flow behaviour of the inflation gas which is as free as possible from turbulence and pressing of the valve elements 3, 4 into the unactivated position.

The holding elements 5, 6 ensure that the valve elements 3, 4 are held securely in the unactivated position. Forces acting over the entire cross section of the flow channel on the holding elements 5, 6 during normal vehicle operation or also during inflation of the airbag 9 are lower than the holding forces exerted by the holding elements 5, 6. This allows reliable positioning of the valve elements 3, 4 in the unactivated position.

Actuating forces which are greater than the holding forces of the holding elements 5, 6 are liberated on activation of the actuators 7, 8. If the holding elements are designed as shear pins, the shear pins are sheared off so that the valve elements 3, 4 are pivoted individually, or together, into the flow channel 2 to reduce the cross section of the flow channel. Instead of the shear pins, projections can also be provided in the lateral walls 12 which project into corresponding recesses in the valve elements 3, 4 and impart the corresponding holding forces. Friction surfaces, which impart the corresponding restraining force, can also be provided between the lateral walls 12 and the lateral surfaces of the valve elements 3, 4.

From the foregoing it will be apparent to those skilled in the art that modifications may be made without departing from the spirit and scope of the present invention. Accordingly, the invention is not intended to be limited except as may be made necessary by the appended claims.

I claim:

1. A device for inflating an airbag comprising a gas generator for producing a inflation gas with a value actuating force and a valve control for adjusting a cross-section of a flow channel through which the inflation gas is supplied to the interior of the airbag by valve element means, the valve elements being held in an unactivated position by holding elements selected from the group consisting of shear pins, lateral flow channel projections, and lateral flow channel frictional surface with a holding force which is lower than the actuating force used to actuate the valve elements.

2. The device for inflating an airbag according to claim 1 wherein the holding elements are shear pins and can be sheared off by the actuating force.

3. The device for inflating an airbag according to claim 2 wherein the valve elements are held in a rattle-free manner in the unactivated position by the holding elements.

4. The device for inflating an airbag according to claim 1 wherein the holding elements are shear pins.

5. The device for inflating an airbag according to claim 4 wherein the valve elements are held in a rattle-free manner in the unactivated position by the holding elements.

6. The device for inflating an airbag according to claim 1 wherein the valve elements are held in a rattle-free manner in the unactivated position by the holding elements.

* * * * *